United States Patent
Hsu

(10) Patent No.: US 10,149,576 B1
(45) Date of Patent: Dec. 11, 2018

(54) AUTOMATIC LIQUID SOAP SUPPLYING SYSTEM

(71) Applicant: HOKWANG INDUSTRIES CO., LTD., New Taipei (TW)

(72) Inventor: Chin-Chan Hsu, New Taipei (TW)

(73) Assignee: HOKWANG INDUSTRIES CO., LTD., New Taipei (TW)

( * ) Notice: Subject to any disclaimer, the term of this patent is extended or adjusted under 35 U.S.C. 154(b) by 0 days.

(21) Appl. No.: 15/704,475

(22) Filed: Sep. 14, 2017

(51) Int. Cl.
*A47K 5/12* (2006.01)
*G01F 23/00* (2006.01)
*G01F 23/36* (2006.01)

(52) U.S. Cl.
CPC ........ *A47K 5/1217* (2013.01); *G01F 23/0007* (2013.01); *G01F 23/366* (2013.01)

(58) Field of Classification Search
CPC ................. A47L 5/1217; A47L 2005/1218
USPC ..................................................... 222/56, 64
See application file for complete search history.

(56) References Cited

U.S. PATENT DOCUMENTS

| | | | |
|---|---|---|---|
| 5,299,713 A * | 4/1994 | Saitoh | A47K 5/1217 222/255 |
| 5,540,362 A | 7/1996 | Azuma et al. | |
| 6,129,245 A | 10/2000 | Redman et al. | |
| 7,364,053 B2 | 4/2008 | Ophardt | |
| 7,455,197 B2 | 11/2008 | Ophardt | |
| 2004/0164093 A1 * | 8/2004 | Redman | A47K 5/1205 222/95 |
| 2014/0263421 A1 * | 9/2014 | Urban | A47K 5/12 222/23 |
| 2015/0223646 A1 * | 8/2015 | Wegelin | A47K 5/1211 222/1 |
| 2015/0251892 A1 * | 9/2015 | Ciavarella | A47K 5/1204 141/326 |
| 2017/0027390 A1 | 2/2017 | Maercovich | |
| 2017/0190565 A1 * | 7/2017 | Proper | B67D 7/0294 |
| 2017/0356173 A1 * | 12/2017 | Loberger | A47K 5/12 |

* cited by examiner

*Primary Examiner* — Jeremy Carroll
(74) *Attorney, Agent, or Firm* — Muncy, Geissler, Olds & Lowe, P.C.

(57) ABSTRACT

An automatic liquid soap supplying system is provided with a plurality of soap dispensing main bodies for discharging a liquid soap, a plurality of soap dispensing components to be respectively connected to the soap dispensing main bodies, a liquid soap filling tank connected to each soap dispensing component, a mounting component provided with a photo display area of necessity for supplying liquid soap, as well as a control unit. In this case, a differential hydrostatic pressure is formed between the liquid soap filling tank and the soap dispensing component, whereby the liquid soap is filled into the soap dispensing component automatically from the liquid soap filling tank through the differential hydrostatic pressure. Moreover, the photo display area of necessity for supplying liquid soap is used to recognize whether supplement of soap is required, and air remained due to the supplement of soap is discharged via a exhaust valve.

8 Claims, 7 Drawing Sheets

AUTOMATIC LIQUID SOAP SUPPLYING SYSTEM

FIELD OF THE INVENTION

The present invention is related to an automatic liquid soap supplying system, particularly to an automatic liquid soap supplying system filling soap through a differential hydrostatic pressure automatically, being capable of avoiding residual of air, and showing the necessity for supplying soap or the fullness of supplied liquid soap through luminous display depending on a liquid level condition.

BACKGROUND OF THE INVENTION

For instance, U.S. Pat. No. 6,129,245 disclosed a "WASHING SYSTEM WITH AUXILIARY RESERVOIR" having a plurality of dispensers, a first collapsible container, a second collapsible container, at least one connecting tube and a supply line. Each dispenser includes a pump having an inlet and an outlet. The first collapsible container is used for containing liquid cleanser, and provided with an outlet. The second collapsible container is used for containing the liquid cleanser and provided with an outlet, the first collapsible container being located above the second collapsible container. The connecting tube is used for communicating the outlet of the first collapsible container with that of the second collapsible container. The supply line is used for communicating the liquid cleanser inside the first collapsible container and the second collapsible container to the plurality of dispensers, so as to permit the flow of liquid cleanser to the dispenser first from the first collapsible container, and then alternatively from the second collapsible container after the liquid cleanser inside the first collapsible container is consumed.

Further, for example, U.S. Pat. No. 7,364,053, entitled "SINK SIDE TOUCHLESS FOAM DISPENSER" and U.S. Pat. No. 7,455,197, entitled "SINK SIDE TOUCHLESS FOAM DISPENSER NOZZLE ASSEMBLY" disclosed a storage compartment used for storing liquid cleanser under the countertop, respectively, delivering the liquid cleanser stored inside the storage compartment to a plurality of dispensers on the countertop through a conduit through a plurality of liquid pumps, such that the liquid cleanser may be discharged via the plurality of dispensers.

Moreover, published U.S. Patent Application No. 2017027390, entitled "AUTOMATIC FOAM SOAP DISPENSER", disclosed a reservoir used for storing liquid cleanser under the countertop, and coupled with a plurality of dispensers on the countertop through piping. Each dispenser is provided therein with a sensor, a motor and a pump, so as to discharge the liquid cleanser via an outlet of the dispenser through the piping through the motor and the pump.

Further, for example, U.S. Pat. No. 5,540,362, entitled "LIQUID SOAP SUPPLYING DEVICE", disclosed a tank for storing liquid soap. The liquid soap is provided for a plurality of nozzles by the tank through a liquid soap supplying pipe. The tank is provided therein with a remaining volume sensor having five-staged contact points in the tank. Moreover, the remaining volume of liquid soap in the tank is recognized by a control part, while a buzzer is controlled by the control part, in such a way that a ring for a specified period of time is used by the remaining volume sensor for cuing when the uppermost level of the remaining volume of liquid soap is reached.

All the above-mentioned patents disclosed the use of the storage for storing the liquid cleanser provided for the plurality of dispensers on the countertop to dispense soap. In all of these patents, however, it is necessary to supply soap on the countertop in the process of supplement of liquid cleanser. Thus, it is apt to spill the liquid cleanser carelessly due to space limitation, with the dirty and disordered under the countertop. Moreover, it is impossible to perceive the content inside the storage from the outside. In general, the consumption of liquid cleanser and the requirement for supplement may be not alerted until the dispenser is incapable of supplying the liquid cleanser. Otherwise, it is necessary for the cleaning staff to inspect the content of the storage at irregular intervals so as to supply the liquid cleanser timely. In this way, working efficiency of the cleaning staff is impacted.

SUMMARY OF THE INVENTION

It is the main object of the present invention to provide an automatic liquid soap supplying system filling soap through a differential hydrostatic pressure automatically, being capable of avoiding residual of air, and showing the necessity for supplying soap or the fullness of supplied liquid soap through luminous display depending on a liquid level condition.

In light of above object, the present invention provides an automatic liquid soap supplying system comprising a plurality of soap dispensing main bodies, a plurality of soap dispensing components, a liquid soap filling tank, a mounting component and a control unit. Each of the soap dispensing main bodies is mounted on a countertop, while each of the soap dispensing main bodies is provided with a soap discharging outlet for discharging a liquid soap and a sensing area for emitting a soap dispensing signal when sensing a human body part. Each of the soap dispensing components is mounted under the countertop and connected to each of the soap dispensing main bodies, respectively. Each of the soap dispensing components is provided with a liquid soap tank used for storing the liquid soap, a soap dispensing machine mounted on the liquid soap tank so as to convey the liquid soap to the soap discharging outlet via a soap discharging pipe, and a control box connected to the sensing area while used for receiving the soap dispensing signal so as to control the soap dispensing machine to provide the liquid soap to the soap discharging outlet from the liquid soap tank. The liquid soap filling tank is mounted under the countertop for storing the liquid soap, and is connected to each of the liquid soap tanks through a soap supplying pipe provided at one end thereof with an exhaust valve for discharging air. The liquid soap filling tank is provided thereon with a liquid soap filling port used for the liquid soap to be filled, and a liquid level detection unit used for detecting a liquid level condition of the liquid soap and emitting a signal of necessity for supplying liquid soap, in which the height of the liquid level detection unit is higher than that of each of the liquid soap tanks, such that a differential hydrostatic pressure is fainted by the liquid soap inside the liquid soap filling tank and that inside each of the liquid soap tanks, whereby the liquid soap is filled into each of the liquid soap tanks automatically from the liquid soap filling tank through the differential hydrostatic pressure. The mounting component includes a fixing part mounted on the countertop, a liquid soap filling pipe provided on the fixing part and connected to the liquid soap filling port so as to allow the liquid soap to be filled to the liquid soap filling tank from the countertop, as well as a light emitting component provided inside the fixing part and allowed for emitting a ray so as to provide the fixing part thereon with a photo display area of necessity for supplying liquid soap. The control unit is electrically connected to the liquid level detection unit and the light emitting component, respectively, for receiving the signal of necessity for supplying liquid soap emitted on the basis of the liquid level condition, while driving the light emitting component to emit the ray depending on the signal of necessity for supplying liquid soap, so as to form the photo display area of necessity for supplying liquid soap on the fixing part.

In one embodiment, the mounting component further includes a cap body, the cap body being provided on the countertop for covering the liquid soap filling pipe, and possibly being removed from the liquid soap filling pipe.

In one embodiment, the liquid soap filling pipe is further formed of a translucent material.

In one embodiment, the fixing part further includes an outer decorative plate provided on the countertop, the cap body being provided in the center of the outer decorative plate and a gap being formed between the cap body and the outer decorative plate, so as to expose a part of the liquid soap filling pipe to the gap, to form the photo display area of necessity for supplying liquid soap.

In one embodiment, the liquid level detection unit further includes an upper liquid level detection unit for detecting upper liquid level of the liquid soap in the liquid soap filling tank, and a lower liquid level detection unit for detecting lower liquid level of the liquid soap in the liquid soap filling tank.

In one embodiment, a switching valve is further provided between the liquid soap filling tank and the soap supplying pipe.

In one embodiment, a switching valve is further provided between the liquid soap tank and the soap supplying pipe.

In one embodiment, the control unit further includes a communication unit capable of transmitting signally to an external electronic device.

In comparison with existing technology, it is substantially for the present invention to effectively achieve, via the above technical solution, advantageous effects as follows.

1. In comparison with the conventional technology, the height of the liquid level detection unit inside the liquid soap filling tank is higher than that of the liquid soap tank in the present invention, such that a differential hydrostatic pressure is formed by the liquid soap inside the liquid soap filling tank and that inside each liquid soap tank, whereby the liquid soap is filled into each liquid soap tank automatically from the liquid soap filling tank through the differential hydrostatic pressure. Thus, the conventional cooperation with several pumps may be eliminated, so as to reduce the cost effectively, and lower complexity in future maintenance.

2. It is possible for the liquid soap to be supplied to the liquid soap filling tank from the countertop directly without the need for dismantling the liquid soap filling tank, and the efficiency in supplement of soap is then enhanced.

3. When the liquid soap is supplied through the liquid soap filling port from the countertop, and air is then brought into the soap supplying pipe, it is capable of discharging air via the exhaust valve, so as to prevent air from being remained inside the soap supplying pipe.

4. The photo display area of necessity for supplying liquid soap is used on the countertop directly to recognize whether supplement of soap is required.

DETAILED DESCRIPTION OF THE PREFERRED EMBODIMENTS

Figure 1:
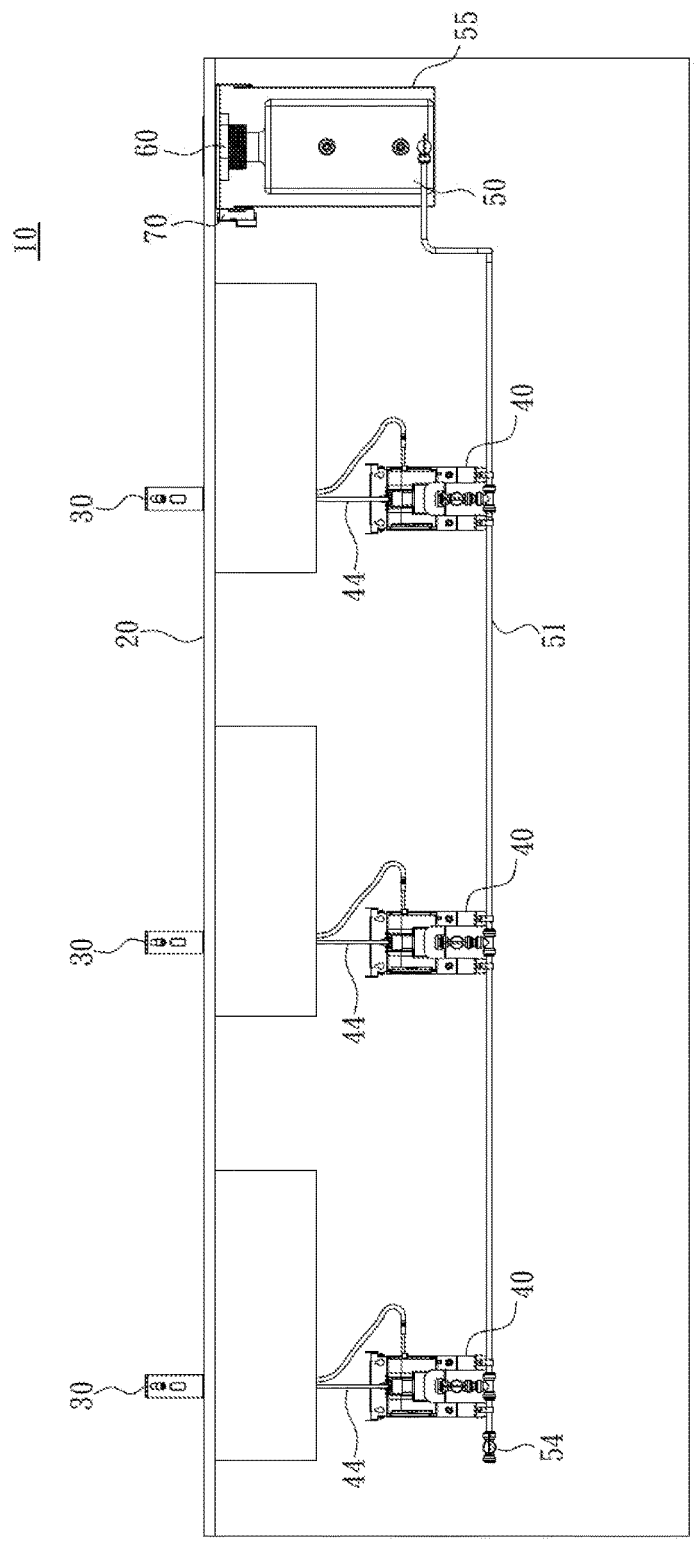
FIG. 1 is a plan view of the present invention.
Figure 2:
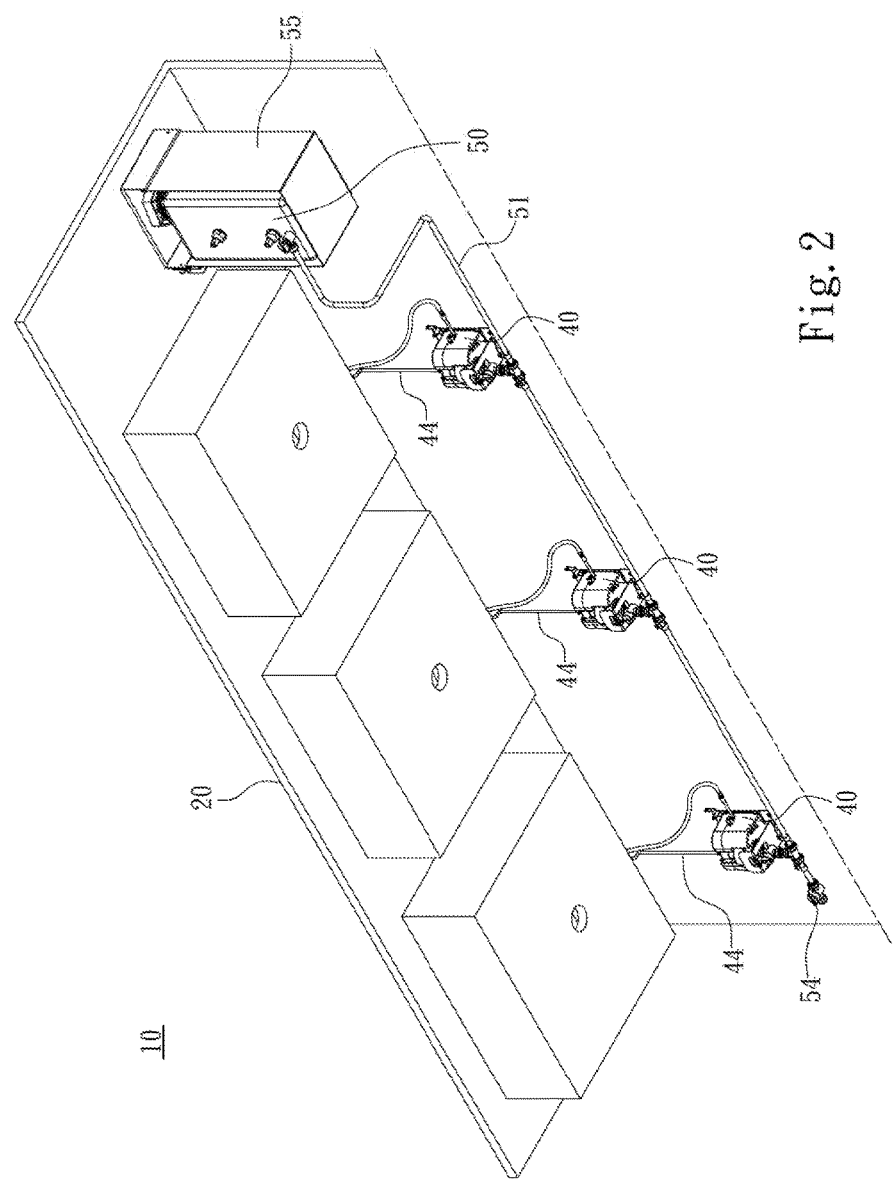
FIG. 2 is a perspective view of the present invention.
Figure 3:
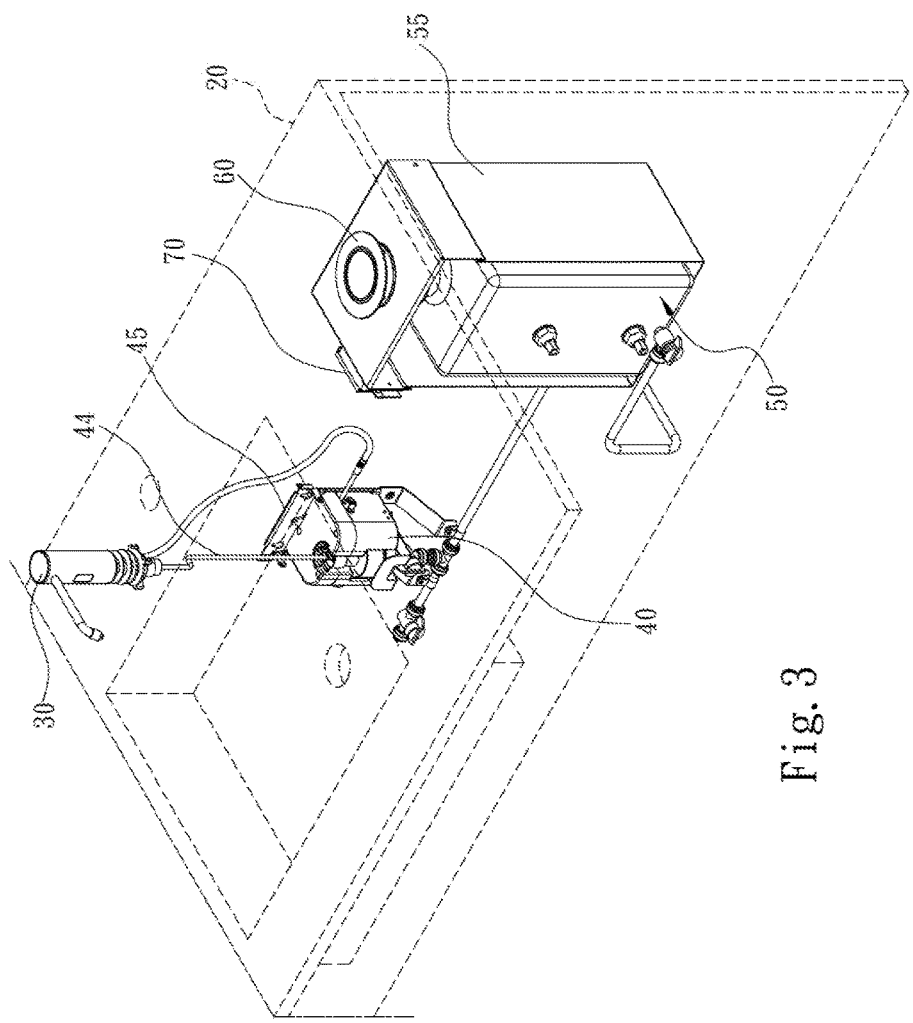
FIG. 3 is a partial perspective view at the other viewing angle of the present invention.
Figure 4:
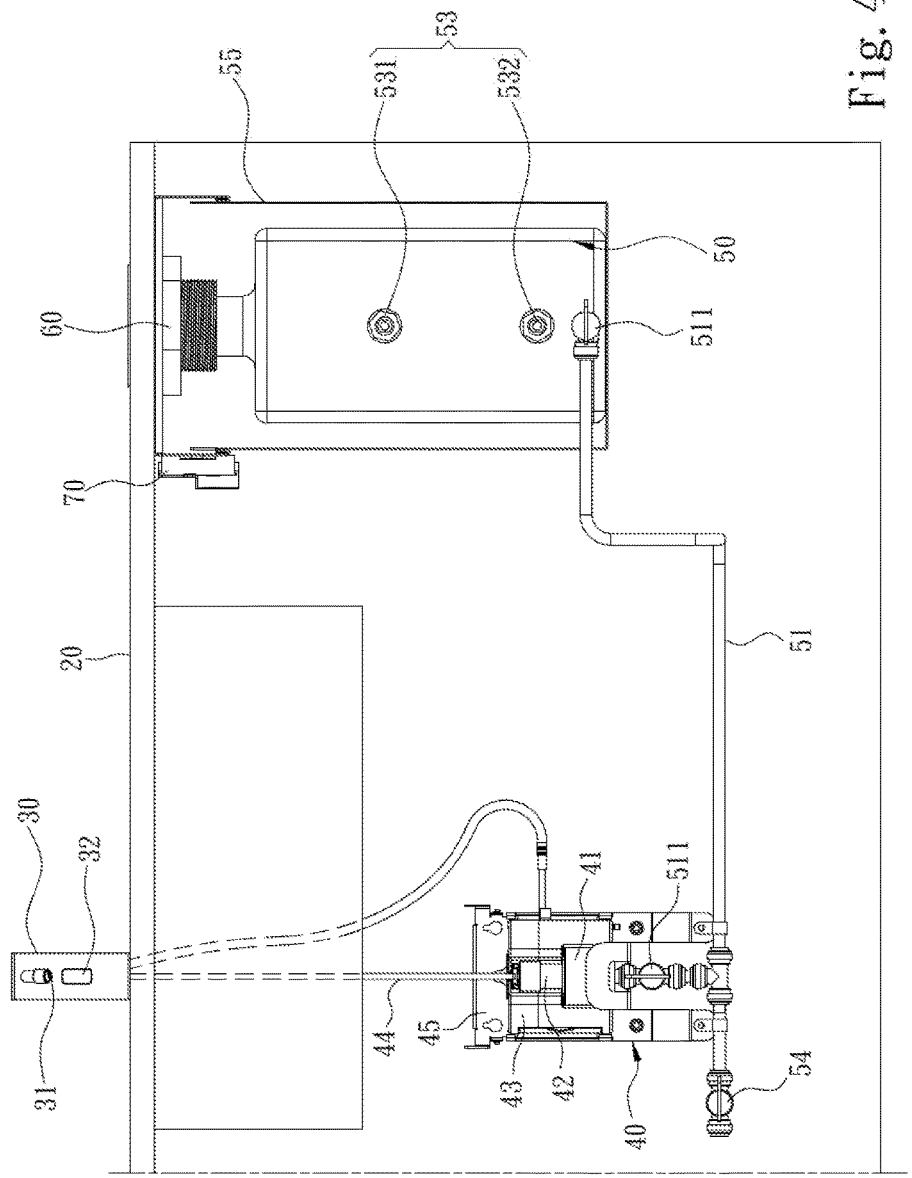
FIG. 4 is a partial plan view of the present invention.

The detailed description and technical content related to the present invention is described in accompany with the drawings as follows.

Referring to FIGS. 1 to 4 together, an automatic liquid soap supplying system 10 provided by the present invention is used to be provided on a countertop 20 and to supply a liquid soap automatically, the automatic liquid soap supplying system 10 including a plurality of soap dispensing main bodies 30, a plurality of soap dispensing components 40, a liquid soap filling tank 50, a mounting component 60 and a control unit 70.

The plurality of soap dispensing main bodies 30 are mounted in a position, corresponding to a sink, on the countertop 20. Each of the soap dispensing main bodies 30 is provided with a soap discharging outlet 31 for discharging the liquid soap, and a sensing area 32 used for sensing a human body part and emitting a soap dispensing signal. In this embodiment, the human body part is referred to as a human hand. When the hand approaches the location of the soap discharging outlet 31, the sensing area 32 is allowed to emit a soap dispensing signal after sensing the approach of hand.

The plurality of soap dispensing components 40 are provided under the countertop 20 and each of the soap dispensing components 40 is connected to each of the soap dispensing main bodies 30, respectively. In other words, the number of the soap dispensing main bodies 30 is the same as that of the soap dispensing components 40, such that each of the soap dispensing components 40 is cooperated with one of the soap dispensing main bodies 30. Each of the soap dispensing components 40 includes a liquid soap tank 41, a soap dispensing machine 42 and a control box 43. For each of the soap dispensing components 40, in this embodiment, the soap dispensing component 40 is fixed on a wall under the countertop 20 through a supporting bracket 45, while the liquid soap tank 41 is used for storing the liquid soap. The soap dispensing machine 42 is provided on the liquid soap tank 41, and connected to the soap discharging outlet 31 of the soap dispensing main body 30 via a soap discharging pipe 44. The control box 43 is electrically connected to the sensing area 32, and used for receiving the soap dispensing signal emitted from the sensing area 32. After receiving the soap dispensing signal, the control box 43 is allowed to drive the soap dispensing machine 42, so as to convey the liquid soap stored inside the liquid soap tank 41 to the soap discharging outlet 31 through the soap discharging pipe 44 through the soap dispensing machine 42, and then discharge the liquid soap via the soap discharging outlet 31. Thus, the liquid soap is obtained by the human hand from the soap discharging outlet 31. Further, it is possible for each of the soap dispensing main bodies 30 to supply the liquid soap on the countertop 20 independently.

Figure 5:
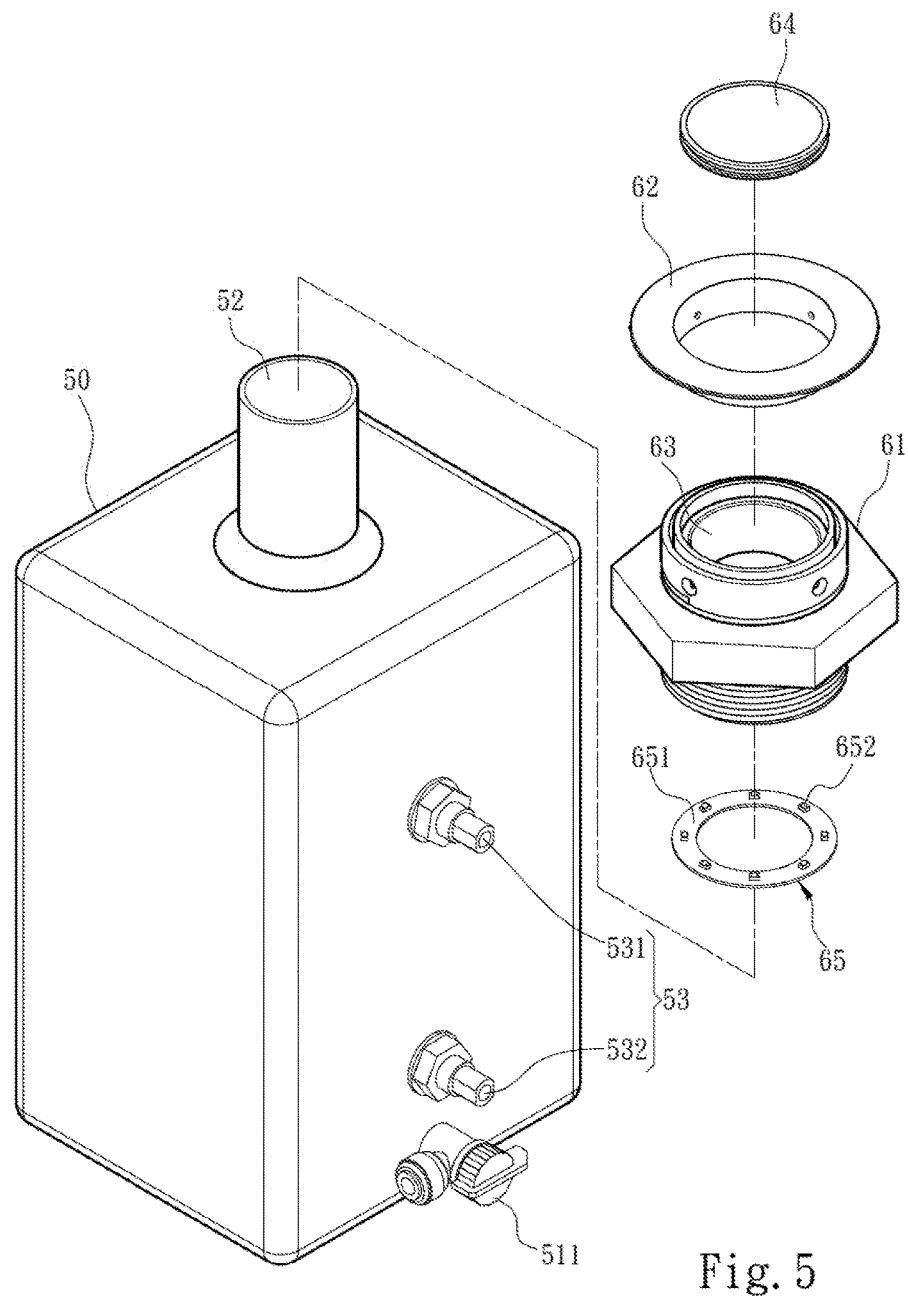
FIG. 5 is a disassembled view of a liquid soap filling tank of the present invention.
Figure 6:
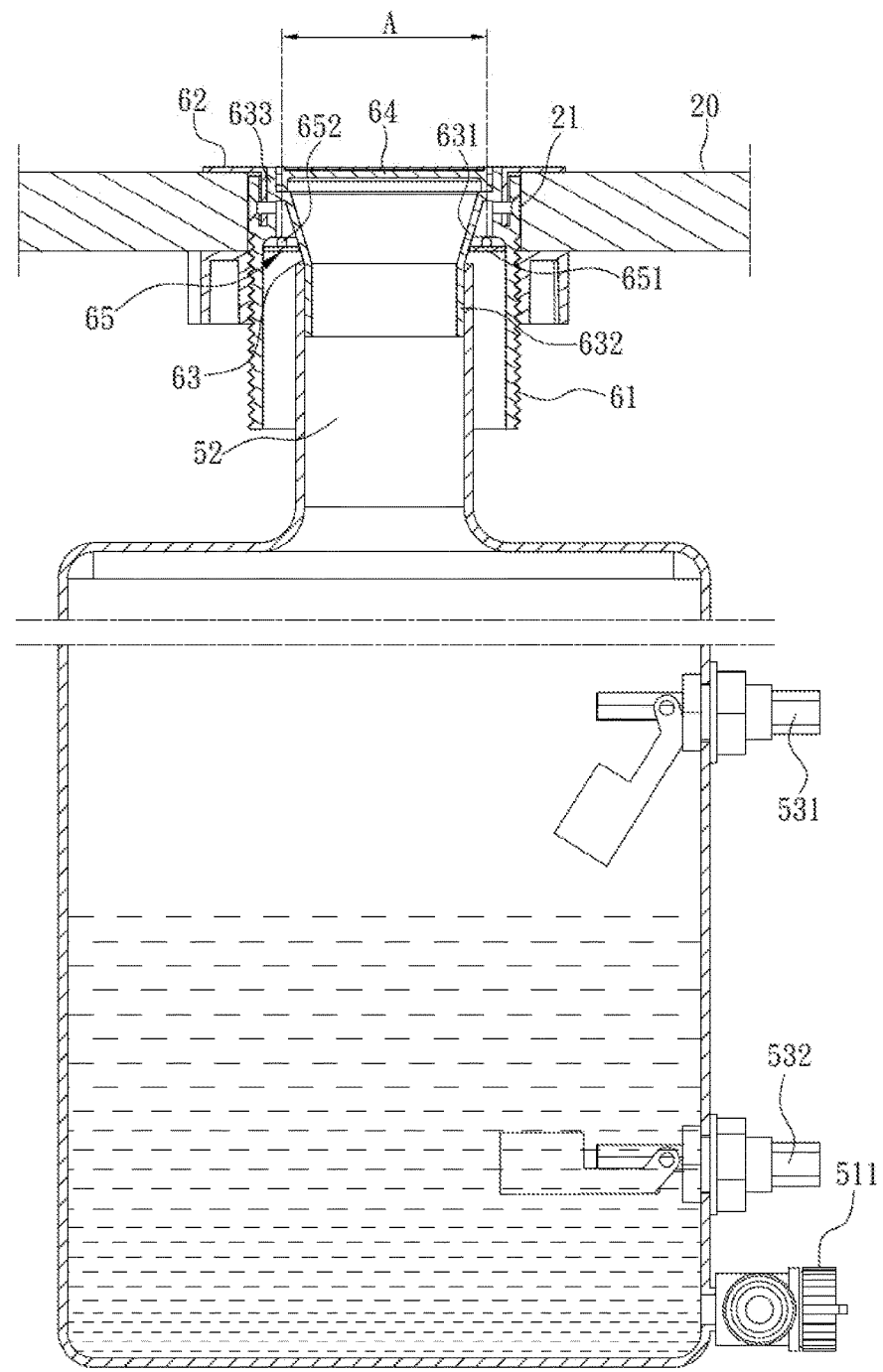
FIG. 6 is a cross-section view of the liquid soap filling tank of the present invention.

The liquid soap filling tank 50 is mounted under the countertop 20, similarly to the soap dispensing component 40, and is connected to each liquid soap tank 41 of the soap dispensing component 40 through a soap supplying pipe 51. In this embodiment, the soap dispensing components 40 are connected to the liquid soap filling tank 50 in series through the soap supplying pipe 51, and the liquid soap filling tank 50 is mounted in a position under the countertop 20 through a mounting bracket 55. Referring to FIGS. 5 and 6 cooperatively, the liquid soap filling tank 50 is similarly used for storing the liquid soap, and used for supplying the liquid soap into the liquid soap tank 41 of the soap dispensing component 40. On the liquid soap filling tank 50, there is provided with a liquid soap filling port 52 used for the liquid soap to be filled. Moreover, inside the liquid soap filling tank 50, there is provided with a liquid level detection unit 53 used for detecting a liquid level condition of the liquid soap and emitting a detecting signal depending on the liquid level condition. In this embodiment, moreover, the liquid level detection unit 53 inside the liquid soap filling tank 50 includes an upper liquid level detection unit 531 and a lower liquid level detection unit 532. The upper liquid level detection unit 531 is provided in an upper position inside the liquid soap filling tank 50 for detecting the upper liquid level of the liquid soap in the liquid soap filling tank 50 and then emitting a signal of detecting completion of filling liquid soap when the liquid soap reaches the upper liquid level, while the lower liquid level detection unit 532 is provided in a lower position inside the liquid soap filling tank 50 for detecting the lower liquid level of the liquid soap in the liquid soap filling tank 50 and then emitting a signal of detecting necessity for supplying liquid soap when the liquid soap reaches the lower liquid level. In addition, each of connection between the liquid soap filling tank 50 and the soap supplying pipe 51 and that between each liquid soap tank 41 and this soap supplying pipe 51 is provided with a switching valve 511, respectively, such that the liquid soap may be prevented from flowing between the liquid soap filling tank 50, the liquid soap tanks 41, and the soap supplying pipe 51 via the switching valves 511 when the maintenance of the soap dispensing components 40 or the liquid soap filling tank 50 is required. Further, leakage of the liquid soap during maintenance is avoided. Furthermore, the soap supplying pipe 51 is further provided at one end thereof with an exhaust valve 54.

The mounting component 60 is mounted on the countertop 20, as illustrated in FIGS. 5 and 6 similarly, by cutting a fixing hole 21 on the countertop 20 firstly, such that the mounting component 60, including a fixing part 61, an outer decorative plate 62, a liquid soap filling pipe 63, a cap body 64 and a light emitting component 65, is allowed to be mounted in the position of the fixing hole 21. The fixing part 61 is a hollow pipe mounted inside the fixing hole 21. The outer decorative plate 62 is coveringly provided over the fixing part 61 and mounted on the countertop 20. The liquid soap filling pipe 63 is provided in the center of the outer decorative plate 62, and provided thereon with a funnel shaped liquid soap guiding portion 631. The liquid soap guiding portion 631 is extendingly provided with a liquid soap flowing portion 632 extending to the liquid soap filling port 52 in a direction toward the liquid soap filling tank 50, while the liquid soap guiding portion 631 is further extendingly provided with a covering portion 633 in a direction toward the countertop 20. It is worth noting that the liquid soap filling pipe 63 in the present invention is made of a translucent material. The cap body 64 is provided in the center of the outer decorative plate 62, and a gap is formed between this cap body 64 and the outer decorative plate 62. The cap body 64 is used for covering the covering portion 633 to close the liquid soap guiding portion 631, so as to expose the covering portion 633 of the liquid soap filling pipe 63 to the gap between the cap body 64 and the outer decorative plate 62. The top of the covering portion 633 is exposed to the countertop 20, so as to form a photo display area A of necessity for supplying liquid soap on the countertop 20. The light emitting component 65 is provided inside the fixing part 61 and coveringly provided over the external of the liquid soap filling pipe 63. Moreover, the light emitting component 65 includes a circuit board 651 and a plurality of light emitting elements 652 mounted on the circuit board 651. The light emitting element 652 is allowed for emitting a ray, passing through the covering portion 633 of the liquid soap filling pipe 63 to be projected outward so as to provide the countertop 20 thereon with a photo display area A of necessity for supplying liquid soap.

Figure 7:
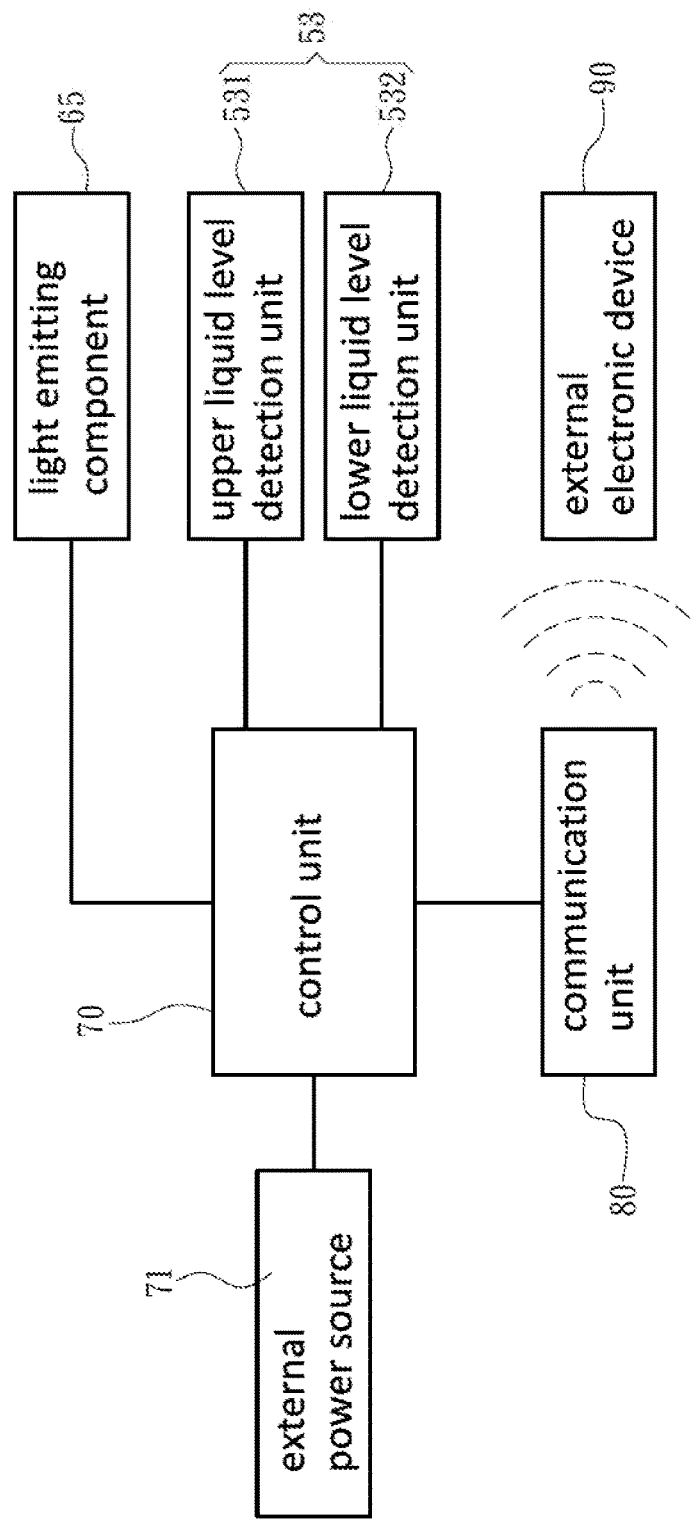
FIG. 7 is a block diagram of the circuit for the display of necessity for the supplement of liquid soap of the present invention.

The control unit 70, referring to FIGS. 5 to 7 cooperatively, is mounted at one side of the mounting bracket 55. The control unit 70 is used for connecting to an external power source 71, and is electrically connected to the liquid level detection unit 53 and the light emitting component 65, respectively. In this embodiment, the control unit 70 is electrically connected to the upper liquid level detection unit 531, the lower liquid level detection unit 532 and the light emitting component 65, respectively, and is used for receiving the detecting signal emitted from the upper liquid level detection unit 531 and the lower liquid level detection unit 532, while controlling the light emitting component 65 to emit rays of different colors depending on the detecting signal. The rays are allowed to pass through the liquid soap filling pipe 63 and then project outward, and further form the photo display area A of necessity for supplying liquid soap. In this embodiment, when the signal of detecting necessity for supplying liquid soap emitted from the lower liquid level detection unit 532 is received by the control unit 70, the light emitting element 652 is driven by the control unit 70 to emit the ray, such as a red ray, for example, such that the red ray is allowed to pass through the liquid soap filling pipe 63 and then form a red photo display area of necessity for supplying liquid soap on the countertop 20. On the contrary, when the signal of detecting completion of filling liquid soap emitted from the upper liquid level detection unit 531 is received by the control unit 70, the light emitting element 652 is driven by the control unit 70 to emit the ray of another color, such as a blue ray, for example, such that the blue ray is allowed to pass through the liquid soap filling pipe 63 and then form a blue photo display area of necessity for supplying liquid soap on the countertop 20. Thereby, the content of liquid soap inside the liquid soap filling tank 50 is identified to determine whether soap should be supplied or supplement of soap is completed through display of different colors via the photo display area A of necessity for supplying liquid soap.

Additionally, in this embodiment, the control unit 70 is further coupled with a communication unit 80. The communication unit 80 is used for coupling with an external electronic device 90. Moreover, the communication unit 80 and the external electronic device 90 are transmitted signally therebetween on the basis of a communication protocol. In other words, when the control unit 70 is connected to the upper liquid level detection unit 531 and the lower liquid level detection unit 532, it is capable of transmitting the detecting signal to the external electronic device 90 through the communication unit 80 if the detecting signal emitted from the liquid level detection unit 53 is received by the control unit 70. The external electronic device 90 may be a multimedia receiving device, mobile phone and etc., so as to acquire the detecting signal immediately via the external electronic device 90 and then supply soap.

Referring to FIGS. 1 to 7 cooperatively, after the automatic liquid soap supplying system 10 of the present invention is mounted on the countertop 20, it is primary that the sensing signal may be generated and transmitted to the control box 43 when the human hand is sensed by the soap dispensing main body 30 via the sensing area 32. After receiving the sensing signal, the control box 43 is allowed to drive the soap dispensing machine 42, so as to convey the liquid soap to the soap discharging outlet 31 from the liquid soap tank 41 through the soap discharging pipe 44, and then supply the hand with appropriate liquid soap. However, when the content of liquid soap inside one of the plurality of liquid soap tanks 41 is reduced, the liquid soap inside the liquid soap filling tank 50 may be supplied into the liquid soap tank 41 having reduced content through the soap supplying pipe 51, and then the supplement of liquid soap to the liquid soap tank 41 is further achieved. It is worth noting that the height of the liquid soap filling tank 50 is higher than that of each of the plurality of liquid soap tanks 41, while the height of each of the plurality of liquid soap tanks 41 is not higher than that of the lower liquid level detection unit 532 inside the liquid soap filling tank 50; that is to say, the liquid level inside the liquid soap filling tank 50 is higher than that inside each of the plurality of liquid soap tanks 41, such that a differential hydrostatic pressure is generated by the liquid level of liquid soap inside the liquid soap filling tank 50 and that inside each of the plurality of liquid soap tanks 41, and further the automatic supplement of liquid soap to each of the liquid soap tanks 41 of the soap dispensing components 40 through the differential hydrostatic pressure is performed by the liquid soap filling tank 50 simultaneously. In this way, when the liquid soap inside the liquid soap filling tank 50 is lowered in liquid level due to filling the liquid soap tank 41, it is capable of keeping the liquid soap tank 41 in a full condition of liquid soap. In addition, when the liquid soap inside the liquid soap filling tank 50 is lower than the position of the lower liquid level detection unit 532, the signal of detecting necessity for supplying liquid soap is emitted from the lower liquid level detection unit 532, such that the control unit 70 is allowed to drive the light emitting element 652 to emit ray after receiving the signal of detecting necessity for supplying liquid soap, and then form the photo display area A of necessity for supplying liquid soap on the countertop 20. Thus, the photo display area A of necessity for supplying liquid soap on the countertop 20 is used to alarm that supplement to the liquid soap filling tank 50 is required. It is only necessary to remove the cap body 64 from the countertop 20, so as to supply the liquid soap into the liquid soap filling tank 50 through the liquid soap flowing portion 632 of the liquid soap filling pipe 63 on the countertop 20 directly, when supplement of soap to the liquid soap filling tank 50 is desired. After reaching a predetermined liquid level inside the liquid soap filling tank 50, moreover, the liquid soap is allowed to trigger the upper liquid level detection unit 531, such that the signal of detecting completion of filling liquid soap is emitted from the upper liquid level detection unit 531, and the light emitting element 652 is then driven by the control unit 70. In this connection, different rays are used on the countertop 20 to alarm that a high liquid level of the liquid soap filling tank 50 is reached, without the need for the further addition of liquid soap to the liquid soap filling tank 50.

At the end of the soap supplying pipe 51, additionally, the exhaust valve 54 is provided. When the supplement of soap is performed by the flow of the liquid soap through the countertop 20, it is apt for external air to enter the liquid soap filling tank 50 in the process of pouring the liquid soap into the liquid soap filling pipe 63, and then to be remained inside the liquid soap filling tank 50. Thereby, air is entrained to flow when the liquid soap flows inside the soap supplying pipe 51. Therefore, air is prevented from being accumulated inside the soap supplying pipe 51 by discharging air inside the soap supplying pipe 51 via the exhaust valve 54.

In comparison with the prior technology, the height of the liquid level detection unit 53 inside the liquid soap filling tank 50 being higher than that of the liquid soap tank 41 is used in the present invention, such that a differential hydrostatic pressure is formed by the liquid soap inside the liquid soap filling tank 50 and that inside each liquid soap tank 41, whereby the liquid soap is filled into each liquid soap tank 41 automatically from the liquid soap filling tank 50 through the differential hydrostatic pressure. Thus, the conventional cooperation with several pumps may be eliminated, so as to reduce the cost effectively, and lower complexity in future maintenance. Moreover, it is possible for the liquid soap to be supplied to the liquid soap filling tank 50 from the countertop 20 directly without the need for dismantling the liquid soap filling tank 50, and the efficiency in supplement of soap is then enhanced. In addition, when the liquid soap is supplied through the liquid soap filling port 52 from the countertop 20, and air is then brought into the soap supplying pipe 51, it is capable of discharging air via the exhaust valve 54, so as to prevent air from being remained inside the soap supplying pipe 51. In the present invention, meanwhile, the photo display area A of necessity for supplying liquid soap is used on the countertop 20 directly to recognize whether supplement of soap is required.

What is claimed is:

1. An automatic liquid soap supplying system, comprising:
    a plurality of soap dispensing main bodies, each of said soap dispensing main bodies being mounted on a countertop, while each of said soap dispensing main bodies being provided with a soap discharging outlet for discharging a liquid soap and a sensing area for emitting a soap dispensing signal when sensing a human body part;
    a plurality of soap dispensing components, mounted under said countertop and connected to each of said soap dispensing main bodies, respectively, each of said soap dispensing components being provided with a liquid soap tank used for storing said liquid soap, a soap dispensing machine mounted on said liquid soap tank so as to convey said liquid soap to said soap discharging outlet via a soap discharging pipe, and a control box connected to said sensing area while used for receiving said soap dispensing signal so as to control said soap dispensing machine to provide said liquid soap to said soap discharging outlet from said liquid soap tank;
    a liquid soap filling tank, mounted under said countertop for storing said liquid soap, and connected to each of said liquid soap tanks through a soap supplying pipe provided at one end thereof with an exhaust valve for discharging air, said liquid soap filling tank being provided thereon with a liquid soap filling port used for said liquid soap to be filled, and a liquid level detection unit used for detecting a liquid level condition of said liquid soap and emitting a signal for supplying said liquid soap, in which the height of said liquid level detection unit is higher than that of each of said liquid soap tanks, such that a differential hydrostatic pressure is formed by said liquid soap inside said liquid soap filling tank and that inside each of said liquid soap tanks, whereby said liquid soap is filled into each of said liquid soap tanks automatically from said liquid soap filling tank through the differential hydrostatic pressure;

a mounting component, including a fixing part mounted on said countertop, a liquid soap filling pipe provided on said fixing part and connected to said liquid soap filling port so as to allow said liquid soap to be filled to said liquid soap filling tank from said countertop, as well as a light emitting component provided inside said countertop and allowed for emitting a ray so as to provide said fixing part thereon with a photo display area for supplying liquid soap; and a control unit, electrically connected to said liquid level detection unit and said light emitting component, respectively, for receiving said signal for supplying liquid soap emitted on the basis of the liquid level condition, while driving said light emitting component to emit the ray depending on said signal for supplying liquid soap, so as to form said photo display area for supplying liquid soap on said fixing part.

2. The automatic liquid soap supplying system according to claim 1, wherein said mounting component further includes a cap body, said cap body being provided on said countertop for covering said liquid soap filling pipe, and possibly being removed from said liquid soap filling pipe.

3. The automatic liquid soap supplying system according to claim 2, wherein said liquid soap filling pipe is further formed of a translucent material.

4. The automatic liquid soap supplying system according to claim 2, wherein said fixing part further includes an outer decorative plate provided on said countertop, said cap body being provided in the center of said outer decorative plate and a gap being formed between said cap body and said outer decorative plate, so as to expose a part of said liquid soap filling pipe to the gap, to form said photo display area for supplying liquid soap.

5. The automatic liquid soap supplying system according to claim 1, wherein said liquid level detection unit further includes an upper liquid level detection unit for detecting upper liquid level of said liquid soap in said liquid soap filling tank, and a lower liquid level detection unit for detecting lower liquid level of said liquid soap in said liquid soap filling tank.

6. The automatic liquid soap supplying system according to claim 1, wherein a switching valve is further provided between said liquid soap filling tank and said soap supplying pipe.

7. The automatic liquid soap supplying system according to claim 1, wherein a switching valve is further provided between said liquid soap tank of the plurality of soap dispensing components and said soap supplying pipe.

8. The automatic liquid soap supplying system according to claim 1, wherein said control unit further includes a communication unit capable of transmitting signally to an external electronic device.

* * * * *